(12) United States Patent
Kopecek

(10) Patent No.: US 7,788,988 B2
(45) Date of Patent: Sep. 7, 2010

(54) DRIVE ASSEMBLIES

(75) Inventor: Joseph Thomas Kopecek, Santa Clarita, CA (US)

(73) Assignee: Smiths Group PLC, London (GB)

( * ) Notice: Subject to any disclaimer, the term of this patent is extended or adjusted under 35 U.S.C. 154(b) by 642 days.

(21) Appl. No.: 11/226,274

(22) Filed: Sep. 15, 2005

(65) Prior Publication Data

US 2006/0068960 A1    Mar. 30, 2006

(30) Foreign Application Priority Data

Sep. 29, 2004    (GB)    ................................. 0421568.7

(51) Int. Cl.
     *F16H 1/16*          (2006.01)
     *B64C 3/38*          (2006.01)

(52) U.S. Cl. ........................ 74/427; 74/413; 74/665 G; 244/99.2

(58) Field of Classification Search ............. 74/412 TA, 74/412 R, 427, 413, 414, 421 A, 421 R, 665 F, 74/665 G, 665 GA; 244/99.2, 99.3, 76 A; 192/13 R, 49, 218, 220
See application file for complete search history.

(56) References Cited

U.S. PATENT DOCUMENTS

| 645,463 | A | * | 3/1900 | Diffenderffer | 74/427 |
| 1,369,442 | A | * | 2/1921 | Kauffman | 74/427 |
| 2,684,740 | A | * | 7/1954 | Mader | 192/49 |
| 4,685,346 | A | * | 8/1987 | Brackett | 74/427 |
| 5,751,081 | A | * | 5/1998 | Morikawa | 310/83 |
| 6,026,942 | A | * | 2/2000 | Saiko et al. | 192/37 |
| 6,443,034 | B1 | | 9/2002 | Capewell et al. | |
| 6,598,386 | B2 | | 7/2003 | Johnson et al. | |
| 6,645,112 | B1 | * | 11/2003 | Fleytman et al. | 475/228 |
| 6,957,731 | B2 | * | 10/2005 | Lawson, Jr. | 192/218 |

FOREIGN PATENT DOCUMENTS

| EP | 0 253 034 | 1/1988 |
| EP | 0 656 491 | 11/1994 |
| JP | 60037457 | 2/1985 |

OTHER PUBLICATIONS http://auto.howstuffworks.com/differential.htm in particular p. 4 of the disclosure which is attached.*
GB Search Report No. GB0518703.4, dated Nov. 25, 2005, 1 page.

* cited by examiner

*Primary Examiner*—Thomas R Hannon
*Assistant Examiner*—James Pilkington
(74) *Attorney, Agent, or Firm*—Global Patent Operation

(57) ABSTRACT

A drive assembly for providing two outputs from a motor to actuators or the like has a first drive shaft connected with the motor via a torque limiter and a reduction gear. A high efficiency spur gear also connects the motor with a second, parallel drive shaft via a second torque limiter and a reduction gear. The two drive shafts are also interconnected by a low efficiency gear provided by worm pinions on the shafts and a worm gear wheel engaging both pinions, which only transfers load between the drive outputs if there is uneven torsional loading in excess of the settings of the torque limiters.

12 Claims, 2 Drawing Sheets

DRIVE ASSEMBLIES

BACKGROUND OF THE INVENTION

This invention relates to drive assemblies.

The invention is more particularly concerned with drive assemblies for providing two or more outputs to mechanical actuators or the like.

In various aircraft and industrial applications there is a need to drive two or more mechanical actuators or other structures in a synchronized fashion. These applications include engine nacelle thrust reversers, aircraft flap and slat systems, cargo or passenger doors, radar antenna or other large surface area panels that are required to move in a synchronized fashion. Drive assemblies used in such applications should operate in such a way that there is no structural damage in the event of a jam in any part of the guide or drive system. Examples of arrangements providing synchronized outputs are described in U.S. Pat. No. 6,598,386 and U.S. Pat. No. 6,443,034. Conventional arrangements suffer from various disadvantages and, in particular, the drive transmission components tend to be heavy and require a relatively high power motor to drive them.

BRIEF SUMMARY OF THE INVENTION

It is an object of the present invention to provide an alternative drive assembly.

According to one aspect of the present invention there is provided a drive assembly including a drive input arranged to be rotated by a motor, a first drive output driven by the drive input via a first torque limiter, a second drive output driven by the drive input via a high efficiency gear arrangement and a second torque limiter, and a low efficiency gear arrangement interconnecting the first and second drive outputs and operable to transfer load between the first and second drive outputs only if there is uneven torsional loading between the two drive outputs above the torque limiter setting.

The first and second drive outputs preferably have parallel shafts. The high efficiency gear arrangement preferably includes a spur gear and the low efficiency gear arrangement preferably includes a worm pinion and worm gear arrangement. The first and second drive outputs are preferably driven by the drive input via respective reduction gears, such as including planetary gears.

According to another aspect of the present invention there is provided a drive assembly including first and second parallel output shafts each provided with a worm pinion towards one end, a common worm gear engaging the respective worm pinions to provide a low efficiency synchronizing interconnection between the two shafts, a rotary drive input connected with the first output shaft via a first torque limiter and connected with the second output shaft via a transfer gear and a second torque limiter, such that the rotary drive input rotates both output shafts synchronously.

The drive input may include an electric motor or other rotary drive.

A drive assembly according to the present invention will now be described, by way of example, with reference to the accompanying drawings.

DETAILED DESCRIPTION OF THE PREFERRED EMBODIMENT

Figure 1:
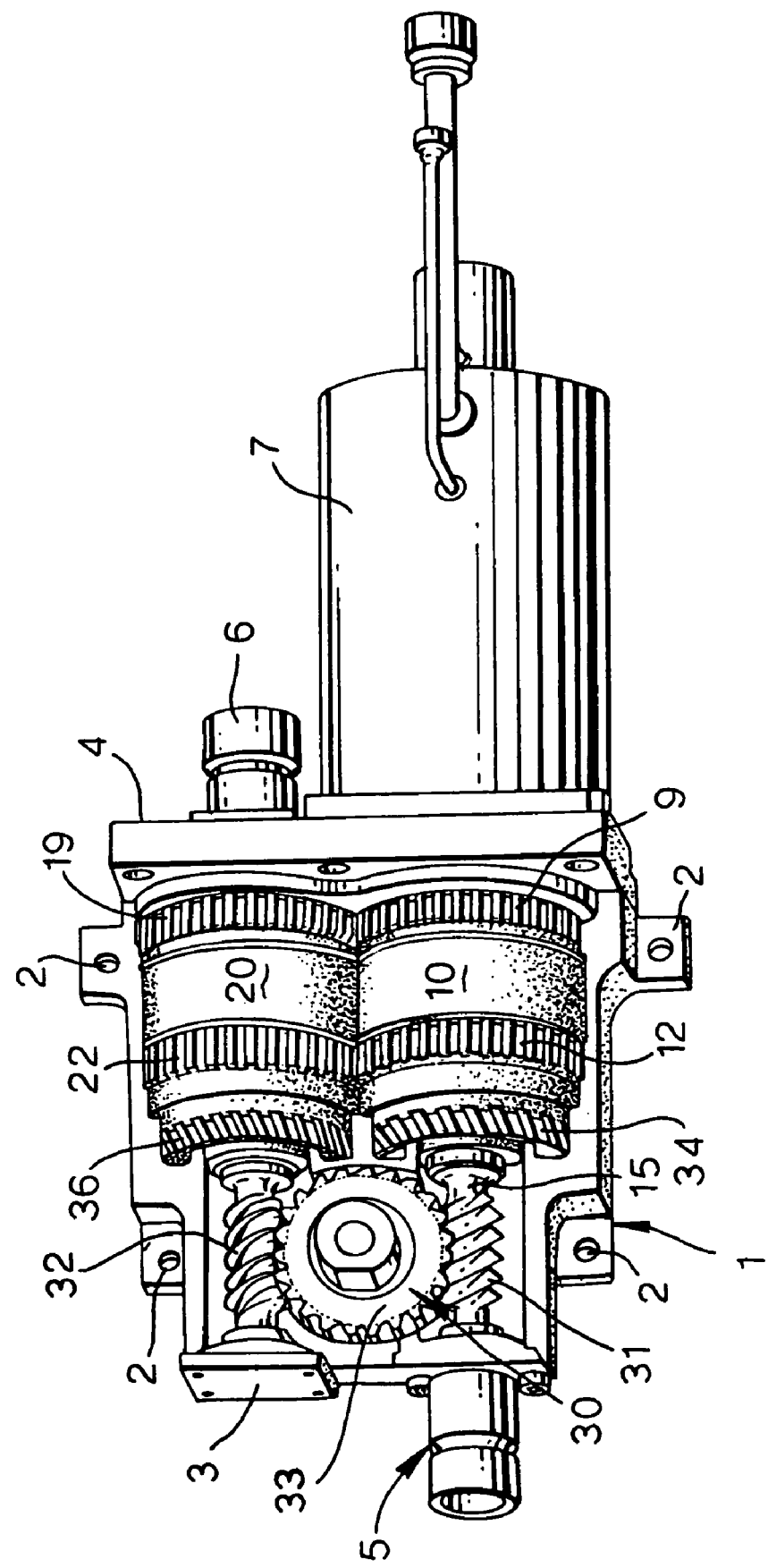
FIG. 1 is a perspective plan view of the assembly with the upper part of its housing removed.
Figure 2:
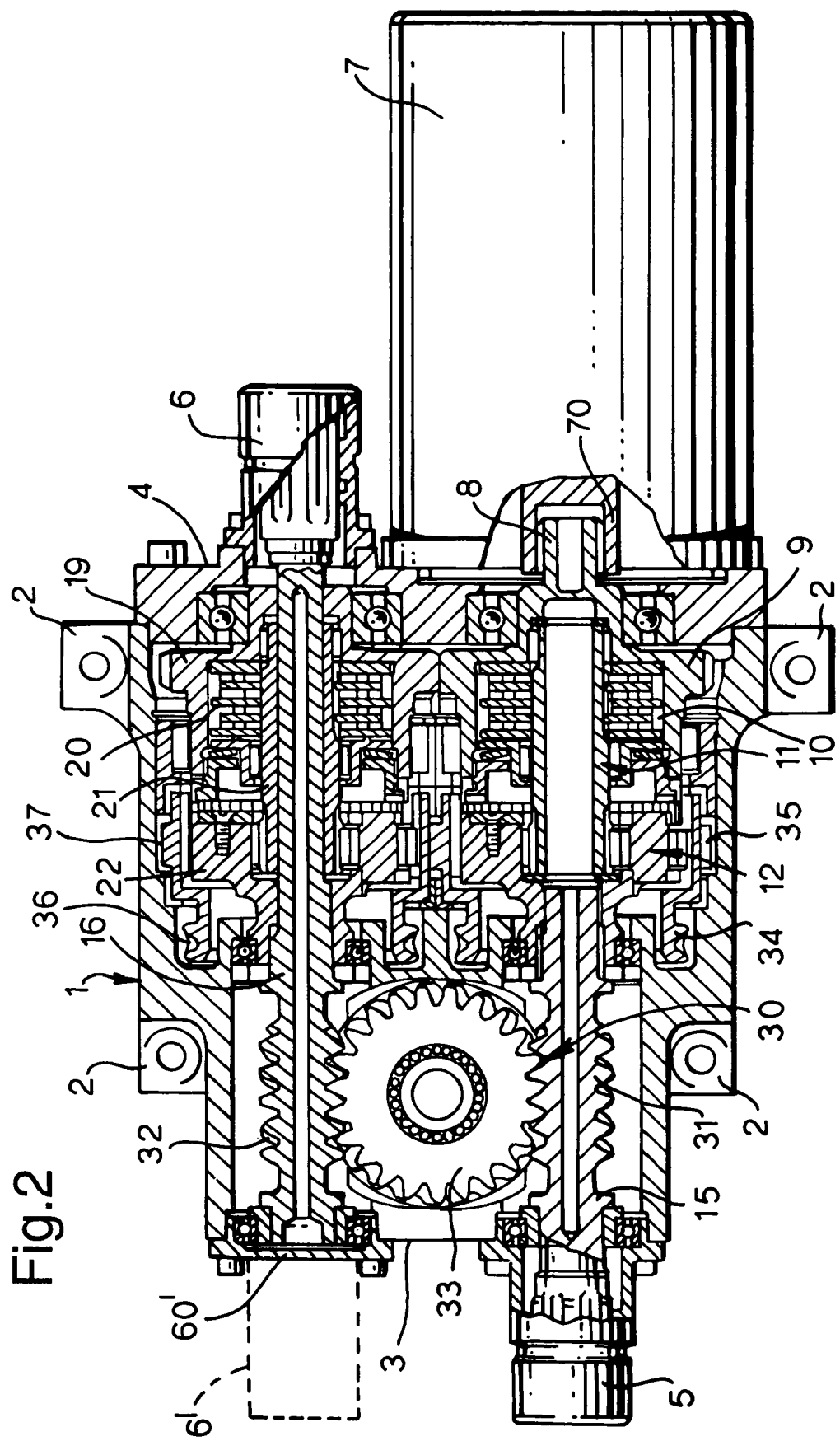
FIG. 2 is a cross-sectional plan view of the assembly.

The drive assembly includes an outer metal housing 1 of generally rectangular section and provided with four mounting feet 2 by which it can be secured in position on an airframe structure. The housing 1 has two parallel opposite end faces 3 and 4 through which drive connection is made to and from the assembly. In the example shown, there are two drive output 5 and 6 at opposite end faces 3 and 4 respectively, which are driven together synchronously by an electric motor 7 mounted of the right-hand end face 4.

Within the housing 1, the two drive outputs 5 and 6 are driven by respective drive shafts 15 and 16 arranged parallel with and spaced laterally from one another. The first, primary drive shaft 15 is connected to be rotated by the motor 7 in the following manner. The drive shaft 70 of the motor 7 is connected with the boss 8 of a spur gear wheel 9 arranged axially and to the right of the output drive shaft 15. The spur gear wheel 9 forms the outer part of a first torque limiter 10 of conventional construction having a tubular, axial output or torque shaft 11. The torque shaft 11 extends forwardly axially and provides the inner part of a planetary reduction gear assembly 12. The gear assembly 12 steps down the rotation of the torque shaft 11 by a factor of 4:1 before it is communicated to the output shaft 15 and thereby increases the motor torque available. Thus, the drive from the motor 7 passes first through the torque limiter 10 and then through the reduction gear 12 before driving the primary output shaft 15 and hence the output 5. By locating the torque limiter 10 close to the motor 7 and before the reduction gear 12, the size and weight of the torque limiter can be kept small.

The second, parallel output shaft 16 is connected with the motor 7 by means of a second spur gear wheel 19 arranged axially of the output shaft and alongside the first spur gear wheel 9, in meshing engagement. The two spur gear wheels 9 and 19 act as a transfer gear assembly to transfer torque with high efficiency and low losses, ensuring equal input rotation of the parallel drive paths. The second spur gear wheel 19 forms the outer part of a second torque limiter 20 having a tubular torque shaft 21, which drives a second planetary reduction gear 22 of the same construction and ratio as the first gear 12. The second reduction gear 22 drives the output shaft 16 to rotate at the same rate as the primary output shaft 15. The teeth 34 and 36 on the end of the planetary ring gears 35 and 37 of the two reduction gears 12 and 22 do not mesh with one another but can be used to connect with a common manual drive (not shown). The common manual drive ensures that the planetary ring gears 35 and 37 do not rotate when the device is driven with the motor 7.

The two output shafts 15 and 16 are interconnected by a synchronization gearing set indicated generally by the numeral 30 towards the forward, left-hand end of the shafts 15 and 16, adjacent the end plate 3. The gearing set 30 comprises a worm pinion 31 and 32, formed on the respective shafts 15 and 16, and a worm gear 33 mounted with the housing 1 between the two shafts and rotatable about an axis orthogonal to the axes of the shafts. The worm gear 33 engages the worm pinions 31 and 32 on the two shafts 15 and 16 so that it is rotated by the shafts. The worm gear 33 ensures that the rotational position and speed of both output shafts 15 and 16 are positively matched with one another; neither output shaft can rotate without a corresponding rotation of the other output shaft. The worm and pinion synchronization gearing set 30 is specifically chosen to have a low efficiency due to the double mesh friction losses. In this way, if there is a jam load on one of the output paths, only a relatively small part of the torque available in the other path will be delivered across the double worm mesh synchronization gear set 30 to the output 5 or 6, the remainder of the load being transferred to the housing 1.

In normal operation, the motor 7 provides two reduced speed output drives at the outputs 5 and 6, which rotate synchronously. As long as the load is within predetermined limits, there is no slipping of either torque limiter 10 or 20. The output shafts 15 and 16 rotate together and no torque is transmitted across the synchronization gearing 30.

If the load at the two outputs 5 and 6 should become unequal but both are still within the torque limits, there will still be no slippage of the torque limiters 10 or 20. There will be negligible load or torque transmitted across the synchronization gearing set 30 because the two output shafts 15 and 16 are still driven directly with one another via the transfer gear assembly 9 and 19.

If the load at one of the outputs 5 or 6 should rise sufficiently to jam the output, the torque limiter 10 or 20 driving that output would reach its slip value but would not slip until additional torque was applied by the motor 7 along the parallel path across the synchronization gearing set 30 and the total torque limiter setting was reached. The torque from the motor 7 is, therefore, summed into the common output that is experiencing the jam condition. Both torque limiters 10 and 20 slip when the load on them exceeds the slip limit and both slip in unison to dissipate the kinetic energy. The motor 7 is in its stall condition and, when motor current exceeds a preset limit, a breaker (not shown) opens to disconnect the motor from its electrical drive and thereby terminate drive to the assembly. Synchronization between the two output shafts 15 and 16 is maintained by the synchronization gearing set 30 while the torque limiters 10 and 20 are functioning.

Similarly, if there should be a jam load at both outlets 5 and 6, both torque limiters 10 and 20 would slip to dissipate the kinetic energy. It is possible that there may be some minor load/torque sharing across the synchronization gearing set 30 under this condition but the effect will be negligible because both sides are in an overload condition.

In all cases, the torque delivered through the torque limiters 10 and 20 and the synchronization gearing set 30 does not exceed a predetermined value and both output drives 5 and 6 are always synchronized.

The drive path through the assembly is highly efficient, thereby enabling the power, size and weight of the motor 7 to be kept to a minimum. The inefficient nature of the synchronization gearing set 30 together with the torque limiters 10 and 20 enable the jam load torque transmitted from the primary and parallel drive paths to the jam point to be reduced considerably. This is an advantage because it enables the structure and the drive path driven by the outputs to be made less robust and, therefore, enables weight to be reduced. In conventional drive assemblies producing synchronized drive of two outputs, when the torque limiter slips, torque in excess of twice the maximum operational requirement is delivered to the jammed-side components. It will be appreciated that this requires the structure being driven to be made much heavier so that it is sufficiently robust that it is not damaged by these torques. In the present arrangement, by contrast, the load at which the torque limiters 10 and 20 slip is only slightly greater than the maximum operational load requirement. The material and geometry of the worm pinion and worm gear synchronization gearing set 30 can be altered to increase or reduce the transfer efficiency as necessary.

It is not essential for the assembly to be driven by an electric motor since various other motors or combinations of motors could be used, including hydraulic or pneumatic motors. Multiple motors could be used if these were advantageous, such as, for example, if the space available did not permit the use of one large motor but did enable two smaller motors to be used.

The configuration of the parallel output shafts of the present arrangement enables increased flexibility in the location of the outputs. For example, the parallel output shaft 16 could have an output 6' provided at the same end as the primary output 5, simply by removing a cover plate 60' on the end plate 3 and making connection with the output shaft 16.

The drive assembly could be provided with additional outputs by arranging one or more additional output shafts (complete with torque limiter and reduction gear) parallel with the primary shaft and coupling them either directly with the primary shaft, or indirectly through a parallel shaft, via a high efficiency transfer gear and a low efficiency synchronizing gear.

What I claim is:

1. A drive assembly, comprising:
    a drive input;
    a first torque limiter;
    a first drive output driven by said drive input via said first torque limiter;
    a second torque limiter;
    a second drive output;
    a transfer gear assembly comprising two gears in meshing engagement,
        one gear forming part of the first torque limiter and arranged axially of said first drive output,
        the other gear forming part of said second torque limiter and arranged axially of said second drive output; and
    a synchronization gearing set interconnecting said first and second drive outputs, and operable to only transfer load between said first and second drive outputs in an event of uneven torsional loading between said two drive outputs above settings of said first and second torque limiters.

2. A drive assembly according to claim 1, wherein said first and second drive outputs have parallel-shafts.

3. A drive assembly according to claim 1, wherein said one gear of said transfer gear assembly is a first spur gear wheel, and wherein said other gear of said transfer gear assembly is a second spur gear wheel.

4. A drive assembly according to claim 1, wherein said synchronization gearing set includes a worm pinion and worm gear arrangement.

5. A drive assembly according to claim 1, wherein said first and second drive outputs include respective reduction gears, and wherein said first and second drive outputs are driven via respective ones of said reduction gears.

6. A drive assembly according to claim 5, wherein said reduction gears are planetary gears.

7. The drive assembly of claim 1, further comprising:
    a motor coupled with the drive input.

8. A drive assembly comprising:
    a drive input;
    a first torque limiter;
    a first drive output driven by said drive input via said first torque limiter;
    a second torque limiter;
    a second drive output
    two gears in meshing engagement,
        one gear forming part of the first torque limiter and arranged axially of said first drive output,
        the other gear forming part of said second torque limiter and arranged axially of said second drive output; and
    a worm pinion and worm gear arrangement interconnecting said first and second drive outputs, and operable to only transfer load between said first and second drive outputs in an event of uneven torsional loading between said first and second drive outputs above predetermined torsional load settings of said first and second torque limiters.

9. A drive assembly according to claim 8, wherein said first and second drive outputs include respective reduction gears, and wherein said first and second drive outputs are driven via respective ones of said reduction gears.

10. A drive assembly according to claim 9, wherein said reduction gears are planetary gears.

11. A drive assembly, comprising:
- a first output shaft arranged parallel a second output shaft, said first output shaft having a first worm pinion and said second output shaft having a second worm pinion;
- a common worm gear, said worm gear engaging said first and second worm pinions to provide a synchronizing interconnection between said first and second output shafts only in an event of uneven torsional loading between said two output shafts above predetermined torsional load settings;
- a rotary drive input coupled with an end of said first output shaft;
- a first torque limiter connected between said first output shaft and said rotary drive input;
- a second torque limiter;
- a transfer gear assembly comprising two gears in meshing engagement,
  - one gear forming part of the first torque limiter and arranged axially of said first output shaft,
  - the other gear forming part of said second torque limiter and arranged axially of said second output shaft,
- such that said rotary drive input can rotate both of said first output shaft and second output shaft synchronously.

12. A drive assembly according to claim 11, further comprising:
- a motor coupled with the rotary drive input.

\* \* \* \* \*